Sept. 9, 1930.  B. C. SHIPMAN  1,775,296
REFRIGERATING APPARATUS AND SYSTEM
Filed Nov. 24, 1924  3 Sheets-Sheet 2

Inventor:
Bennet Carroll Shipman

Sept. 9, 1930. B. C. SHIPMAN 1,775,296
REFRIGERATING APPARATUS AND SYSTEM
Filed Nov. 24, 1924 3 Sheets-Sheet 3

Inventor:
Bennet Carroll Shipman

Patented Sept. 9, 1930

1,775,296

UNITED STATES PATENT OFFICE

BENNET CARROLL SHIPMAN, OF SAN FRANCISCO, CALIFORNIA

REFRIGERATING APPARATUS AND SYSTEM

Application filed November 24, 1924. Serial No. 752,016.

My invention relates to that type of refrigerating apparatus known as intermittent absorption, where one vessel is alternately a generator and an absorber, according as it is heated and cooled. My invention is applicable to this type of apparatus whatever the absorbing medium may be, such as water or charcoal, but is illustrated in the drawings as using water as the most common medium.

Heretofore the intermittent type of absorption refrigerating apparatus has necessarily shown lower efficiency than the continuous type, due, among other things, to the fact that, when cooling the generator after distillation has been completed in order to convert it into an absorber, all the heat previously put into the generator to raise its temperature to the distilling point has been thrown away. Moreover additional water necessary to take away this heat, over and above what may be legitimately required to take away the heat of absorption, has also been used. One of the objects of my invention is to conserve a large part of these wastes, so as to put the intermittent type of absorption plant more on an equality with the continuous type, and at the same time eliminate the objectionable, and in the case of small, self operating plants, the usual unsatisfactory aqua pump.

In those machines using water as an absorbing medium, it has been found practically impossible to prevent some water vapor from being carried over with the gaseous ammonia and condensing with it, and therefore from finally collecting in the evaporator along with the liquid ammonia, whence it cannot return by evaporation as does the ammonia. No matter how small an amount of water may be carried over in each operation of the apparatus, it will eventually accumulate into a large quantity and so finally render the apparatus inoperative, besides from the start rendering it less and less efficient, due to the fact that any water carried over to the evaporator will absorb and retain ammonia therein which should be free to evaporate and return to the absorber-generator. Hence with water so accumulating in the evaporator the cost of operation will steadily increase for a given amount of refrigeration until no refrigeration at all can be secured at any cost. Therefore a second object of my invention is the prevention of accumulation of water in the evaporator by the periodic automatic withdrawal of any water that may reach the evaporator at each cycle of operation of the apparatus, thus keeping the apparatus indefinitely operative at its initial efficiency.

In intermittent absorption machines as heretofore made, the whole apparatus, generator, condenser and evaporator, are all at one pressure, that of condensation, when distilling. If the evaporator is still cold, as for instance just after the last run of refrigeration has been completed, the initial condensation will take place in the evaporator and not in the condenser, because the former is colder than the latter. This causes the heat of condensation to be released in the refrigerated spaces and not in the condensing water, thus heating up the space to be refrigerated, which heat must be later removed on the next run of the apparatus by the useless evaporation of ammonia otherwise available for the production of useful refrigeration. This condensation of ammonia in the evaporator will continue until the evaporator has become heated up to the temperature of the condensing water, and therefore causes a serious reduction in efficiency of machines of this type. Therefore a third object of my invention is to provide an intermittent absorption machine which will extract all the heat of condensation in the condenser itself and thus realize the maximum effect of the liquefied ammonia available in the evaporator.

As is evident, intermittent absorption machines as heretofore made cannot produce even an approximately uniform temperature in the refrigerated spaces, aside from the difficulty above stated, for the reason that they are intermittent and therefore deliver no refrigeration during the heating periods. In addition to that, the rate of refrigeration depends both on a varying amount of heat that may have to be extracted from the refrigerated space and on the rate of cooling of the absorber-generator. Hence the more nearly continuous, but not constant, delivery of refrigeration, and the more proportionate the cooling of the absorber-generator to the requirements of heat removal from the refrigerated space can be made, the more perfect the uniformity of temperature in such refrigerated space will be maintained. Therefore another object of my invention is to produce a continuously operable absorption refrigerating apparatus varying the rate of absorption and of distillation, or of either, proportionate to the varying rate of refrigeration demanded.

In the drawings and specification the application of my invention is shown in only one form, but it will be evident to anyone skilled in the art that many different applications could be made, or in fact, only part of my invention used and the rest omitted. Although one specific and practical form of my invention only is shown and described, and not merely a general diagrammatic arrangement, I do not limit myself to this form. In fact a great improvement in present types of such machines could be effected by utilizing part of my invention only.

Figure 1:
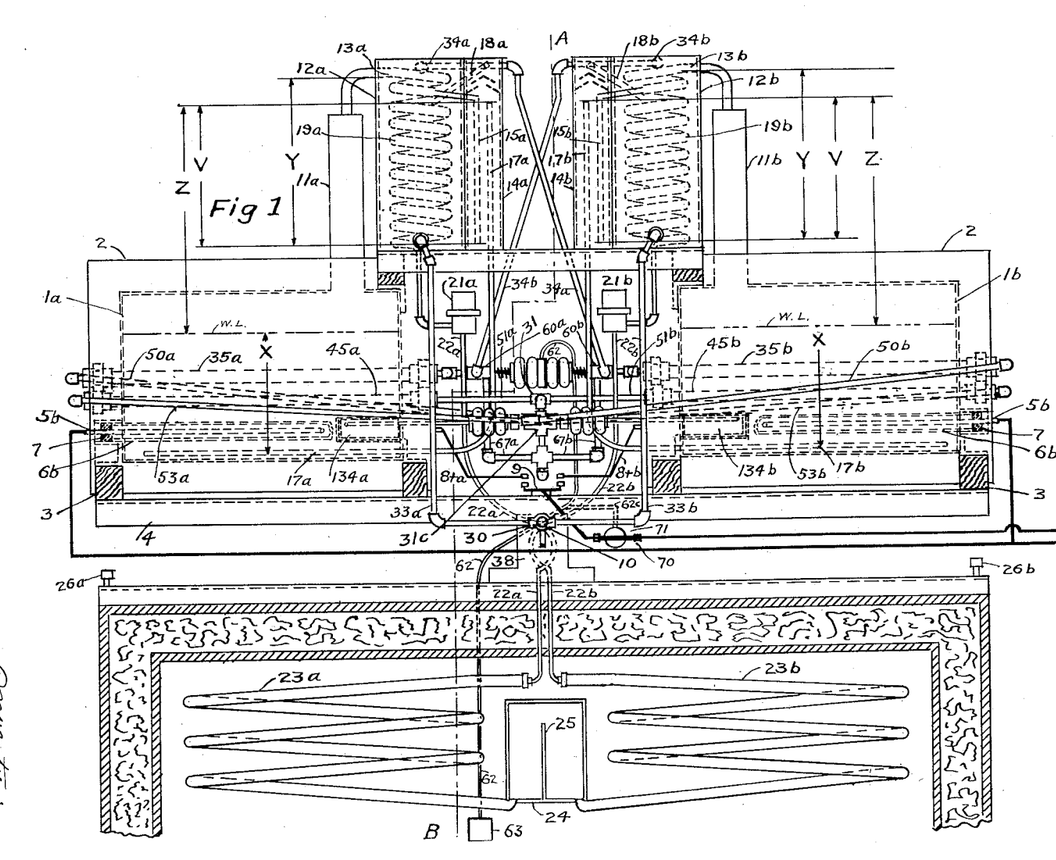
Fig. 1 is a side elevation, partly in section, illustrating my preferred arrangement when using aqua ammonia.
Figure 2:
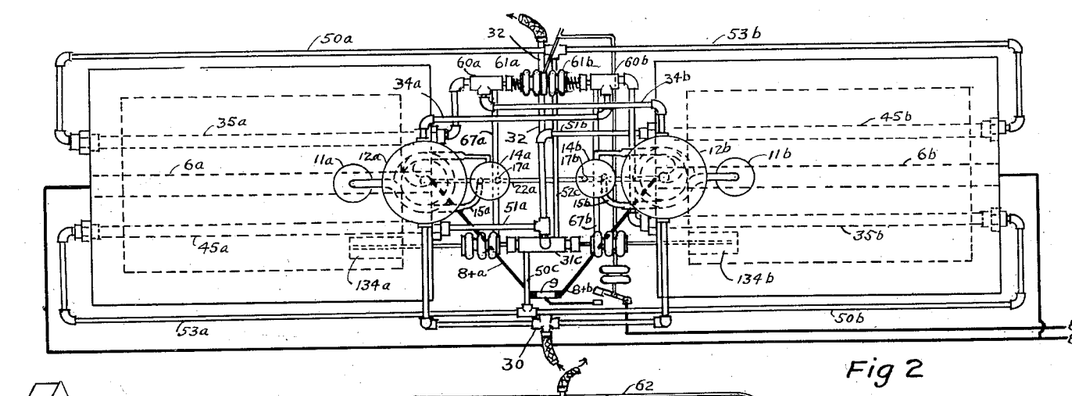
Fig. 2 is a plan view showing the same arrangement.
Figure 3:
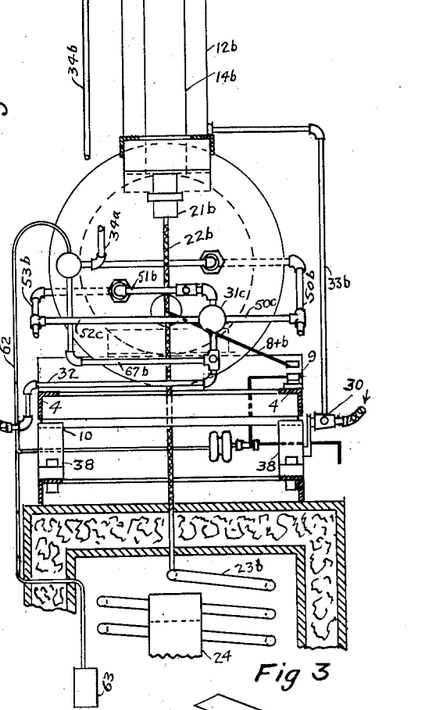
Fig. 3 is a section on the line A—B on Fig. 1 to show clearer some of the pipe connections.
Figure 4:
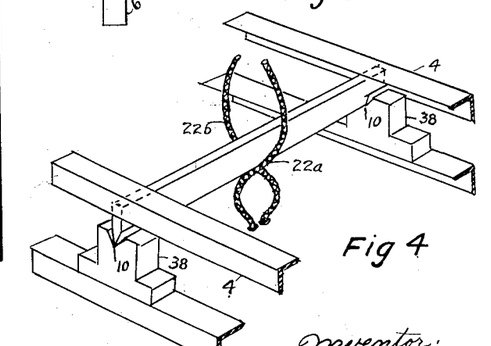
Fig. 4 is a perspective view of the central part of the framework to show the knife edges on which the generator-absorbers and condensers rest and the arrangement of flexible connections between these movable apparatus and the stationary evaporator passing through the center line of movement.
Figure 5:
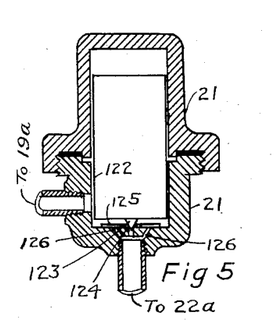
Fig. 5 is an enlarged and detail view in section of one form of combination valve shown in Figs. 1 and 2.

Referring to the drawings in detail, in which like parts bear like numbers in all figures, and understanding that a number without a suffix is generic and applies to either symmetrical part, 1ª and 1ᵇ are cylindrical vessels adapted to act as generators or absorbers; 2 is suitable heat insulation covering the same; 3 are suitable insulating blocks to enable the vessels to be firmly secured to but insulated from the supporting members, 4, which rest at the combined center of gravity on knife edges, 10, so that the whole apparatus can rock slightly, being limited in this motion by the stops, 26ª and 26ᵇ. 5 illustrates one or more electrical heating elements, but may be gas burners, steam pipes, or other sources of heat; 6 are enclosing tubes passing all the way through the generator absorber vessels but shown broken at the inner ends so as not to confuse the drawing; 7 are insulating supports for said electrical heating elements; 8 are connecting wires, 8 − going to one pole of the electric circuit and 8 + going to central contacts of the switch, 9, so arranged that when the apparatus tilts to one side, the heating element of that side will be connected to the central contact of the switch, 9 by the wire 8 + a or 8 + b respectively, thus energizing the heating element of the generator-absorber so tilted down. Assuming that the generator-absorber 1ª, is thus tilted down, the ammonia vapor driven off in consequence of the heat from element, 5ª, passes up the dome, 11ª, into the rectifier coil, 13ª, in the case of the use of aqua ammonia. The rectifier is unnecessary in the case of the use of charcoal or other non-liquid absorbents. The rectifier coils 13ª and 13ᵇ are really steam condensers for the purpose of collecting any water that may pass over in the form of water vapor with the gaseous ammonia or other refrigerating agent used. The ammonia and any accompanying water pass down pipe, 15ª, to the bottom of vessel, 14ª. This vessel is likewise unnecessary in case of use of non-liquid absorbents. This vessel, 14ª, is filled, or in operation becomes filled, with aqua ammonia up to the level of the top of the pipe, 17ª, beyond which point any condensation from rectifier, 13ª, returns to the generator-absorber through overflow and absorbing pipe, 17ª. The uncondensed ammonia vapor with any uncondensed water vapor passing through the rectifier, 13ª, and pipe, 15ª, rises to the surface of liquid in vessel, 14ª, and passes thence through pipe, 18ª, to condenser 19ª, where it is condensed and flows by gravity into the combination of valves, 21ª, through which they cannot pass until a certain amount of liquid has accumulated, as will be noted by reference to Fig. 5, showing said combination of valves in one unit. Although Fig. 5 shows this combination of valves as one unit for simplicity of installation, such unity is not necessary to my invention, as the two valves contained therein may be separate devices without departing from the spirit of my invention, provided they serve to allow liquid to pass but shut off gas attempting to follow, and allow any fluid to return when the pressure in the generator converted to absorber is less than the pressure in the evaporator. In the form illustrated in Fig. 5, 122 represents a float of suitable buoyancy; 123, a valve point operated by said float; 124, a seat cooperating with said point; 125, a disc valve closing ports; 126, connecting one side of the combination with the other side, in effect, a check valve, and 21, a suitable enclosing body and cover. A consideration of this structure will show that a certain accumulation of liquid will lift the float, 122, and therefore the valve point, thereby allowing sufficient liquid to pass the valve to permit the float to reseat the point, thus stopping the flow of liquid. The liquid however cannot pass through the ports, 126, of the check valve as they are closed by the downward pressure of the disk valve, 125. It will be noted that such an arrangement, allowing liquid to pass but stopping gas, will prevent the pressure existing in the generator-absorber and condenser from passing on in to the evaporator, and therefore prevent any condensation in the evaporator. The liquid passing into the evaporator will establish a pressure corresponding to the temperature existing in the evaporator in accordance with the law governing pressure of gas in the presence of its liquid, but this pressure has nothing to do with the operation of this liquid control valve. It should be noted also that valve, 123, operated by float, 122, is not an expansion valve so-called, as it is not operated by the requirements of the expansion side, but by the conditions existing on the condensing or high side. In opening the valve 123 has no regulatory action limiting or throttling the rate of flow of the liquid. On the contrary, it tends to remain closed, due to the weight of the float seating the point, 123, in the seat, 124, until the weight of the float is overcome by the buoyancy in the rising liquid. When the float is raised by the liquid in the valve chamber, the valve point, 123, is unseated and permits the downward flow of the liquid. Other structures differing from that shown may be used to effect the same results and I do not limit myself to the particular type of valves shown.

The liquid, after passing the combination, $21^a$, flows by gravity down through the flexible pipe, $22^a$, to evaporator coil, $23^a$, in the refrigerated space. In order to limit the amount of flexure of pipes, $22^a$ and $22^b$, to a minimum, these pipes or tubes must pass through the axis of the knife edges, 10, on their way to the evaporator coils, $23^a$ and $23^b$. In actual machines it is preferable to place the valve combinations, $21^a$ and $21^b$, within the refrigerated space, for the reason that the liquid after passing such valves takes up the temperature due to the low pressure existing in the evaporator and therefore causes frost, but they have been shown outside in the drawings to make the arrangement clearer. In the evaporator coils, $23^a$, the liquid ammonia will begin to evaporate absorbing the heat, and so pass through said coils, and if the apparatus be properly designed and proportioned, will arrive at the bottom of the evaporator trap, 24, substantially all in the form of gas, together with whatever water may have been brought over. The evaporator trap, 24, is separated into two sections by a septum or partition, 25, reaching from the bottom nearly to the top, or sufficiently high to accommodate in one such section any water that may be brought over. It is evident that any liquid or water delivered into one of these sections cannot pass over the septum, while the gas passes up over the septum, down the other side and thence out through the other evaporator coil, $23^b$, the flexible pipe, $22^b$, the valve combination, $21^b$, the condenser coil, $19^b$, and into the top of the chamber, $14^b$. At this point there are two alternate paths, one back through the rectifier, $13^b$, to the top of the absorber-generator, $1^b$, and the other down through the overflow and absorbing pipe, $17^b$, to the bottom of the said absorber-generator. It is a well known fact that any absorbable or condensable vapor must be delivered to a submerged point of an absorbing liquid if rapid absorption or condensation is to take place, as for instance condensing steam in water. Therefore in this case it is necessary to make the gas travel down the absorbing pipe, $17^b$, and not through the coil, $13^b$. The aqua in vessels, 14, effects this result provided the vertical distance, Y, from the bottom of pipe, 15, to the lowest point of the top of the condenser, 13, is greater than the vertical distance, X, from the liquid level in the absorber-generator to the absorbing pipe, 17, inside the same absorber-generator. This is an essential condition, and the difference must be sufficiently great to compensate for the difference of specific gravity at times of the aqua in the absorber-generator and the aqua in the vessel, 14. When properly designed, therefore, the gas will pass down pipe, $17^b$, and thus be absorbed in the aqua in the absorber-generator, $1^b$.

When sufficient gas to bring the solution of the aqua to the desired minimum condition has been distilled from the generator-absorber, $1^a$, and absorbed into the absorber-generator, $1^b$, the decrease of weight in $1^a$ and the increase of weight in $1^b$ will cause the apparatus to tilt on the knife edges, 10. If the center of gravity in the vessels, $1^a$ and $1^b$ were substantially stationary, as would be the case with some forms of such vessels, the movement of this apparatus would resemble that of a pair of scales, where the motion is very gradual. Such a movement is not desirable, however, but, on the contrary, the action once started should gain momentum rapidly and continuously to its other limit so that it may develop power sufficient to operate the necessary heat and water control devices. This cumulative action is effected by making the horizontal dimension of the vessels, $1^a$ and $1^b$, relatively greater than the vertical dimension. In this way, assuming generator-absorber, $1^a$, down, and the absorber-generator, $1^b$, up, the center of gravity of the liquid contents of generator-absorber, $1^a$, is farther from the axis of the knife edges, 10, than is the center of gravity of the liquid contents of absorber-generator, $1^b$. However when sufficient gas has been distilled from $1^a$ and absorbed in $1^b$ to more than compensate for the greater leverage of $1^a$, and the combination starts to tilt, the readjustment of the liquid centers of gravity, coming closer to the axis of oscillation in $1^a$ and moving farther away from the axis of oscillation in $1^b$, will cause a constantly increasing acceleration of movement and in turn an increasing difference of effective action of such centers of gravity, which again in turn will increase the acceleration. Thus the action of tilting is sharp and definite, and delivered with sufficient energy to operate suitable devices controlling the water and heat.

The above described action of tilting from one extreme position to the other disconnects the electrical contact of $8+a$ of switch, 9, and makes the electrical contact of $8+b$, thereby cutting the heat off from generator-absorber, $1^a$, and putting it on generator-absorber $1^b$, thus causing a reversal of their respective functions, so that the operations above described take place in reverse order, and the above description will equally apply by substituting the suffix, "b," for the suffix, "a," and vice versa.

In heating either generator-absorber to drive off the gas, it should be noted that there are two paths from the generator-absorber to the rectifier $19^a$ or $19^b$, one, that above described, and the other from the bottom of the generator-absorber up the absorbing pipe, 17, into vessel, 14. As a certain pressure must be generated in the generator-absorber, 1, in excess of that in vessel, 14, in order to overcome the static head of the submergence of the pipe, 15, in vessel, 14, it is essential that the vertical distance, V, from the bottom of pipe, 15, to the top of pipe, 17, be less than the vertical distance, Z, from the surface of the liquid in the generator-absorber, 1, to the top of pipe, 17, in vessel, 14, thereby ensuring that the pressure generated in generator-absorber will relieve itself via the path above described and not up through the absorbing pipe, 17.

In order not to complicate the matter, the above description has been concerned solely with the path of the gas in distillation, condensation, evaporation and re-absorption from one generator-absorber to the other absorber-generator. However in order to make the apparatus perform the functions described, cooling and condensing water must be appropriately applied, which for the sake of clarity will now be separately described.

A suitable source of water supply is connected to the three-way cock, 30, co-axial with the knife edges, 10, through a flexible connection, in order to limit the amount of movement to a minimum. The three-way cock, 30, attached to the supporting member, 4, of the apparatus is operated by the oscillation of the apparatus, the lever controlling the plug of the cock being attached to a stationary element, such as the bearing, 38. In this manner, for instance if the generator-absorber, $1^a$, is down, the cock is in such position that water is admitted to pipe, $33^a$, and cut off from pipe, $33^b$. Water will then flow from the source of supply through cock, 30, and pipe, $33^a$, to the bottom of vessel, $12^a$, submerging condenser coils, $19^a$ and $13^a$, thence out the overflow, $34^a$, down through valve, $60^b$, described below, to cooling tube, $35^b$, in absorber-generator, $1^b$, thence through pipes, $50^b$ and $53^a$, to the heating tube, $45^a$, in generator-absorber, $1^a$, thence by pipe, $51^a$, to T, 31, and through the diaphragm operated water by-pass valve, $31^c$, described below, and finally by pipe, 32, to the opposite side of the machine to an outlet connection co-axial with the knife edges, 10, by flexible connection to waste. With this arrangement, it will be noted that after the water has been used for cooling the condenser, it is again used for cooling the absorber-generator, thus economizing in the use of water, as no additional supply is necessary for the latter purpose.

Figure 7:
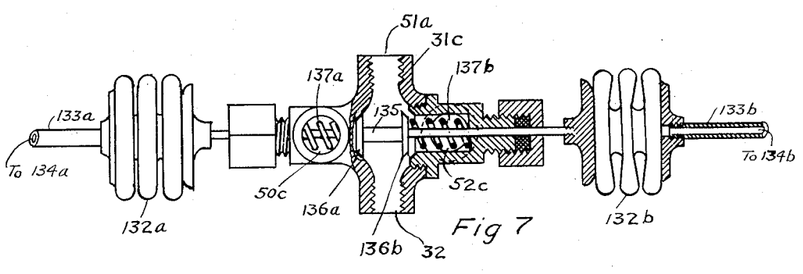
Fig. 7 is an enlarged view of another diaphragh operated valve adapted to govern heat interchange between the vessels.

In the above described circuit, the water after leaving the cooling tube, $35^b$, in absorber-generator $1^b$, where it has absorbed heat, flows through pipe, $50^b$, on its way to the generator-absorber, $1^a$, where, when hotter than the contents of the latter, it will give up a portion of its heat to the same, thus transferring heat abstracted from the absorber-generator, $1^b$, to the generator-absorber, $1^a$, and reducing the amount of heat thereby necessary to bring the generator-absorber up to the generating temperature. At some point, however, the temperature of the generator-absorber rising and the temperature of the absorber-generator falling will equal each other, and beyond that point the cooling water leaving the absorber-generator and passing through the generator-absorber would abstract heat from the generator-absorber instead of adding it. Therefore when this equalization point is reached, or preferably a little in advance of it, the cooling water from the absorber-generator should be prevented from further contact with the generator-absorber. This is effected by means of the diaphragm controlled valve, $31^c$, shown in detail in Fig. 7. It consists of a four ported valve body, through which the water passes unobstructed, as above described, via the pipes, $51^a$ or $51^b$, to exhaust pipe, 32, and to waste. This valve, $31^c$, has two valve discs, $136^a$ and $136^b$, on a common stem, 135, so arranged that when valve disc is seated the other is off its seat. This stem, 135, is subject to the opposing tensions of two compression springs, $137^a$ and $137^b$, so that under their combined influence alone neither of the discs will be seated, but occupy a central, neutral position. The valve stem, however, is also subject to the opposing pressures of the two bellows diaphragms, 132$^a$ and 132$^b$, energized by the pressures arising from some volatile fluid contained in the bulbs, 134$^a$ and 134$^b$ placed respectively in the vessels, 1$^a$ and 1$^b$, and connected by tubes, 133$^a$ and 133$^b$, to the above diaphragms. The valve disc, 136$^a$, serves to connect or disconnect the open passageway of the valve, 31$^c$, with the opening, 50$^c$, connecting with the low point of the pipes, 53$^a$ and 50$^b$. Similarly the valve disc, 136$^b$, serves to connect or disconnect the same passageway with the connection, 52$^c$, connecting with the low point of the pipes, 50$^a$ and 53$^b$, which are the corresponding pipes to 53$^a$ and 50$^b$, when 1$^b$ is the generator and 1$^a$ the absorber. With this opposed arrangement, it is evident that while the absorber-generator, 1$^b$, is hotter than the generator-absorber, 1$^a$, the diaphragm, 132$^b$, will exert more pressure than diaphragm, 132$^a$, and therefore push the valve stem, 135, to its extreme poistion towards the $a$ side of the apparatus, thus seating the valve disc, 136$^a$, and closing the corresponding drain pipe, 50$^c$, so that the water after passing through the absorber-generator, 1$^b$, must continue on through the generator-absorber, 1$^a$, as already described. However, as the temperature of 1$^b$ comes down due to the cooling water passing, and the temperature of 1$^a$ comes up due both to the hotter water from 1$^b$ passing through and to heat from the heating element, 6, the pressure in diaphragm 132$^b$ will decrease and the pressure in diaphragm 132$^a$ will increase, and at about the point of equality, or shortly before, the valve stem, 135, will move toward the $b$ side of the apparatus, thus opening valve disc, 136$^a$, and so draining from pipe, 50$^b$, directly into waste the water that before continued on through the generator-absorber, 1$^a$. This action prevents any further water from reaching generator-absorber, 1$^a$, which thereafter through this cycle is subject only to the heat of the element, 6. In this manner all the heat contained in the generator-absorber at the time of reversing from generator to absorber above a certain point of equality is transferred to the other absorber-generator at the time of its reversal from absorber to generator, thus saving the heat that would otherwise be wasted in cooling the newly converted absorber-generator down to the absorbing point.

Similar circuits cause similar results when 1$^b$ is acting as generator and 1$^a$ as absorber, in that case the pipe, 52$^c$, being the short circuiting drain connection, operated by valve disc, 136$^b$, connecting from the pipes, 50$^a$ and 53$^b$, which serve to connect from the cooling tube, 35$^a$ of the absorber-generator, 1$^a$, to the heating tube, 45$^b$, of the generator-absorber, 1$^b$, exactly as in the case described.

It will be noted that when the apparatus tilts from the down position of the $a$ side to the down position of the $b$ side, the three-way cock will then turn the water supply into pipe, 33$^b$, and cut it off from pipe, 33$^a$, thus cooling the $b$ condenser, and flowing thence to the cooling tube in absorber-generator, 1$^a$.

Figure 6:
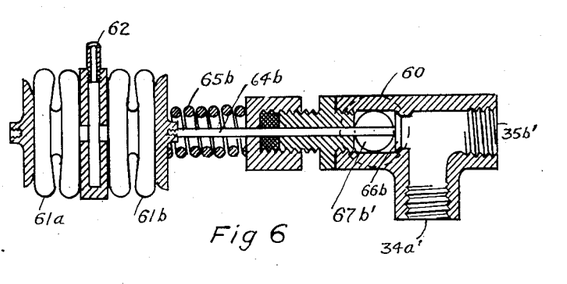
Fig. 6 is an enlarged view, partly in section of diaphragm operated valves, in which only one valve is shown, the other valve being identical and symmetrical with the valve shown.

Interposed between the condensers' overflow and the respective cooling tubes on both sides, there are placed diaphragm-controlled valves, 60, shown in detail in Fig. 6, the two diaphragms being shown but only one valve, the other valve being a duplicate exactly opposite and symmetrically arranged in reference to the diaphragms. Both diaphragms are in connection through a central section by means of a flexible tube, 62, passing through the axis of the knife edges, 10, with a bulb, 63, in the refrigerated space, containing some suitable volatile fluid. There will therefore be a pressure existing in the said diaphragms corresponding to the temperature to which the said bulb, 63, is subjected. A rise in such temperature will cause the diaphragms to expand and push on the valve stems, 64$^b$ and 64$^a$ (not shown), thereby compressing the springs, 65$^b$ and 65$^a$ (not shown), and seating the valve discs, 66$^b$ and 66$^a$ (not shown). In the case of 1$^a$ being the generator and 1$^b$ the absorber, the water leaving the condenser-tank, 12$^a$, through the pipe, 34$^a$, will enter the port, 34$^{a\prime}$ of the valve, 60, and pass out the port 35$^{b\prime}$, to the cooling tube, 35$^b$, of the absorber-generator, 1$^b$, as previously described, as long as sufficient pressure exists in the diaphragms, 61$^a$ and 61$^b$, to keep the valve disc, 66$^b$, against its seat, and all such water will be utilized in cooling the absorber-generator, 1$^b$, which will then be absorbing at its maximum rate. When however the refrigerated temperature falls to a predetermined point corresponding to the adjustment of tension (no adjustment shown) of the spring, 65$^b$, the said tension will overcome the pressure then existing in the diaphragms, 61$^a$ and 61$^b$, and cause the valve disc, 66$^b$, to leave its seat. In consequence, water entering the port, 34$^{a\prime}$ will not flow out the port, 35$^{b\prime}$, but will pass the valve disc and out port, 67$^{b\prime}$, as a path of less resistance, and thence through pipe, 67$^b$, to a cross in the escape pipe, 32, and so to waste. When this happens, the absorber-generator, 1$^b$, will be receiving no cooling water, and consequently will rise in temperature and therefore in pressure, due to the continued absorption of gas. Such rise in pressure will gradually reduce the rate of absorption until it will eventually stop the absorption altogether, and thus first reduce and finally cut off the refrigeration taking place in the evaporator. In this manner the temperature of the refrigerated space can be kept practically uniform regardless of varying rates of heat leakage into such space, as for instance the different rates of heat leakage by day or by night. It will be readily understood from the drawings that a similar operation to that above described produces similar results when $1^b$ is the generator and $1^a$ the absorber.

Reduction in the rate of absorption, in the case of duplex apparatus, necessitates reduction in the rate of distillation, as otherwise the liquid refrigerant would accumulate in the evaporator liquid trap, and therefore on reversal of the apparatus would be returned as liquid to the vessel from which it originated without performing its refrigerating function, thus wasting the heat heretofore abstracted in its condensation. Therefore I provide a thermostatically operated switch, 70, in the case of electric heat, but which may be a suitable valve, or other device in the case of steam, gas, or other source of heat, controlled by the temperature of the refrigerated space. As shown in the drawings, this switch is operated by a diaphragm, 71, directly connected to the contact arm of the switch and subjected to the same pressure of the volatile fluid in bulb, 63, in the refrigerated space as in the case of the diaphragms, $61^a$ and $61^b$, operating the water valves, $60^a$ and $60^b$. Adjusting tension for the contact arm of the switch is omitted for simplicity. It is evident that a rise of temperature in the refrigerated space causing a rise in pressure in the said bulb and its connecting tubes, 62 and $62^c$, the latter of which connects to the diaphragm, 71, will operate to close the electric switch at the same time that it closes the valves, $60^a$ and $60^b$, thus supplying heat to one generator-absorber while cooling the other absorber-generator, and vice versa, and maintaining the proper balance between generation and absorption. Conversely a fall in temperature of the refrigerated space will operate to open the electric circuit at the same time it opens the said valves, thus interrupting the supply of heat to one generator-absorber while stopping the supply of cooling water to the other absorber-generator, and vice versa.

While the arrangement illustrated shows a by-pass valve for controlling the water cooling the absorber-generator, it is evident that a total stop valve could be equally as well used, and in some cases would be preferable for economy in water. Therefore I do not limit myself to the exact arrangement shown, but include any means of cutting off the water from the absorber-generator to reduce or stop the absorption. It is also evident that this means of regulating absorption is as applicable to one vessel used both as generator and as absorber as to two or more vessels so used.

As pointed out above, a certain percentage of water vapor is carried over from the generator to the rectifier $19^a$ or $19^b$ and thence to the evaporator, when using water as an absorbent. Heretofore there has been no satisfactory automatic means for returning such water to the generator. My invention provides positive means for returning such water without interfering in any way with the normal and efficient operation of such machines. Returning to the description above, where the liquefied refrigerant enters the evaporator coil, $23^a$, with whatever water might accompany it, it was pointed out that in a suitably proportioned apparatus such liquid refrigerant would be practically all evaporated by the time it reached the vessel, 24, and whatever water, or water and liquid, that might remain would collect in the $a$ side of the vessel, 24, while the gas passed on to be absorbed in the absorber-generator, $1^b$. Any water so collecting will remain there until the reversal of the apparatus. As soon as the vessel, $1^a$, is cooled sufficiently to absorb, and the vessel, $1^b$, is heated sufficiently to generate, the liquid in the $a$ side of the vessel, 24, will be forced at once back up through the coil, $23^a$, thence through the flexible pipe, $22^a$, condenser, $19^a$, and so into the vessel, $14^a$, whence it will return by gravity through the overflow and absorbing pipe, $17^a$, to the absorber-generator, $1^a$, from which it came. Similarly also with any water coming over from the other generator-absorber, $1^b$. The water necessarily has to return before any gas can be absorbed, and is driven before such gas. This action effectually prevents the accumulation of any water whatever in the evaporator, as it is returned positively and completely at each cycle of operation, thus maintaining initial efficiency indefinitely.

While the arrangement illustrated is the preferable one for small refrigerating units, in larger units and in certain circumstances it is more desirable to have the condenser stationary and in a different space relation to the generator. In such cases the flexible connections will be between the generator and condenser instead of between the condenser and evaporator. My invention is in nowise limited to the particular location shown of such flexible connections.

In the claims in this case I have used the word aqua to indicate the aqua ammonia used in the system, and which forms a permanent working part thereof, and without which fluid refrigerant of some kind the system is absolutely inoperative.

While the apparatus I show consists of two generator-absorbers mechanically connected together for the purpose of utilizing the waste heat of one absorber to help heat the other generator, it will be evident that only that part of my invention providing for the heat interchange, and the return of water from the evaporator to the generator necessitates two such generator-absorbers. Other parts of my invention are just as applicable to a single generator-absorber, and I do not limit myself to the duplex construction shown. It will also be evident that the particular type of thermostatically controlled devices I illustrate are not essential, but others of a totally different construction could be equally as well used and produce the same results.

In general, I do not claim the particular type of construction of any of the various devices as shown, but do claim, and desire to secure by Letters Patent, the following:

1. In a refrigerating system the combination of a vessel adapted to act alternately as a generator and as an absorber, a condenser, an evaporator, a pipe system connecting the generator absorber, the condenser, and evaporator, and means for alternately supplying and extracting heat from said vessel with means for preventing uncondensed fluid from passing into the evaporator but operable for free return of any fluid from the evaporator.

2. In a refrigerating system the combination of a vessel containing an absorbent adapted to act alternately as a generator and as an absorber, an absorbable refrigerating fluid, a condenser, an evaporator, a pipe system connecting the generator absorber, condenser and evaporator, means responsive to the condition of said refrigerating fluid in said vessel for alternately supplying and extracting heat from said vessel with means for preventing the passage of uncondensed fluid into said evaporator but operable for the free return of any fluid from said evaporator back to said vessel.

3. In a refrigerating system a combination of a vessel adapted to act alternately as generator and as absorber, a condenser, a storage receptacle, an evaporator therein, means responsive to the amount of refrigerant in said vessel for alternately supplying heat to said vessel as a generator, and for extracting heat from said vessel as an absorber, means responsive to the temperature produced by the evaporator in the storage receptacle for controlling the rate of extracting heat from said vessel, and means for preventing the passage of uncondensed gas from said condenser into said evaporator, and for allowing the reverse flow of any fluid from said evaporator back into said condenser and vessel.

4. In a refrigerating system, the combination of two vessels adapted to act alternately and simultaneously as generator and as absorber, two condensers, a storage receptacle, an evaporator therein, means responsive to the relative amounts of refrigerant in said vessels for alternately supplying heat to one of said vessels as a generator and for extracting heat from the other of said vessels as an absorber, and means responsive to the temperature produced by the evaporator in the storage receptacle for controlling the rate of supplying heat to either of said vessels.

5. In a refrigerating system, the combination of two vessels adapted to act alternately and simultaneously as generator and as absorber, condensers connected therewith, an evaporator in connection with a storage space, means for alternately and simultaneously heating and cooling the said vessels respectively, means for preventing the passage of uncondensed fluid into the evaporator, but operable to allow the free reverse return of any fluid from said evaporator, and means responsive to the temperature produced in the storage space by the evaporator for controlling the said heat supplying means.

6. In a refrigerating system the combination of a stationary evaporator, a counterbalanced vessel adapted to act alternately as a generator and as an absorber and to oscillate about a horizontal axis, and a flexible section in the connecting conduit between said evaporator and said vessel passing through the axis of oscillation of said vessel.

7. In a refrigerating system, the combination of a stationary evaporator, a counterbalanced vessel adapted to act alternately as a generator and as an absorber and to oscillate about a horizontal axis, means for heating and cooling said vessel, means controlled by the oscillation of said vessel adapted to operate the said heating and cooling means alternately, and a conduit from said evaporator to said vessel a flexible section of which passes through the axis of oscillation of said vessel.

8. In a refrigerating system the combination of a condenser, an evaporator, a counterbalanced vessel adapted to act alternately as generator and as absorber and to oscillate about an axis, means for heating and cooling said vessel, means controlled by the oscillation of said vessel for operating the heating and cooling means alternately, means between said condenser and evaporator for preventing uncondensed gas from passing into the evaporator and means connected between the evaporator and said vessel for passing in a reverse flow any fluid from the evaporator to said vessel.

9. In a refrigerating system the combination of a condenser, a receptacle having a storage space, an evaporator therein to cool the same, a counterbalanced vessel adapted to act alternately as a generator and as an absorber and to oscillate about an axis, means for heating and cooling said vessel, means controlled by the oscillation of said vessel for operating the said heating and cooling means alternately, means responsive to the temperature produced in said storage space by said evaporator for regulating the said cooling means, means connected between said condenser and evaporator for passing liquid into the evaporator and for stopping uncondensed gas from passing thereinto, and means connected between the evaporator and said vessel for passing any fluid from said evaporator back into the vessel as absorber.

10. In a refrigerating system the combination of a receptacle containing a refrigerated space, an evaporator adapted to cool given space, a counterbalanced vessel adapted to act alternately as a generator and as an absorber and to oscillate about a horizontal axis, means for heating and cooling said vessel, means controlled by the oscillation of said vessel for operating said heating and cooling means alternately, means responsive to the temperature produced in said given space by said evaporator for controlling the rate of application of said heating and cooling means.

11. In a refrigerating apparatus, the combination of two closed vessels adapted to act alternately as generator and as absorber, means for applying heating and cooling media to said vessels, an evaporator, two condensers connected respectively between the two ends of said evaporator and the said two vessels, means connected between each of the said condensers and said evaporator for preventing the passage of uncondensed fluid into the evaporator, means connected between the said evaporator and each of the said two vessels for permitting the passage of any fluid from said evaporator into either of said vessels when acting as absorber, with means for applying the said cooling medium after having been applied to either of said vessels acting as absorber to the other said vessel acting as a generator.

12. In an absorption refrigerating apparatus, the combination of two similar vessels adapted to act alternately and simultaneously, one as generator and the other as absorber, primary and secondary heating tubes in each of said vessels, cooling pipes in each of said vessels, and means for simultaneously supplying heat to the primary heating tubes of either vessel and cooling medium successively, first to the cooling pipes of the other vessel, and then to the secondary heating tubes of the first vessel and vice versa.

13. In an absorption refrigerating apparatus, a combination of two similar vessels adapted to act alternately and simultaneously as generator and as absorber, condenser, evaporator, and a connecting pipe system with means for delivering to either vessel acting as generator heat abstracted from either vessel acting as absorber.

14. In an absorption refrigerating apparatus the combination of condenser, evaporator, a connecting pipe system, two similar vessels adapted to act alternately and simultaneously as generator and as absorber and means for appropriately heating and cooling said vessels, with means for transferring heat from the cooling vessel to the heating vessel.

15. In an absorption refrigerating apparatus, the combination of two similar vessels adapted to act alternately and simultaneously as generator and as absorber, means for heating either vessel as generator and cooling either vessel as absorber, condenser, evaporator, and a connecting pipe system with means for passing the medium used to cool the absorber vessel thereafter through the generator vessel.

16. In an absorption refrigerating apparatus, the combination of two similar vessels adapted to act alternately and simultaneously as generator and as absorber, condenser, evaporator, a connecting pipe system, means for heating either vessel as generator, and for simultaneously cooling the other vessel as absorber, with means responsive to the temperatures of both vessels for applying the medium used to cool the absorber vessel thereafter to the generator vessel only as long as the temperature of the absorber vessel is above that of the generator.

17. In an absorption refrigerating apparatus, the combination of two similar vessels adapted to act alternately and simultaneously as generator and as absorber, condenser, evaporator, a connecting pipe system, means for heating either vessel as generator and for simultaneously cooling the other vessel as absorber, means for applying the medium used to cool the absorber vessel thereafter to the generator vessel, with means responsive to the temperatures of both vessels for interrupting the said application of the medium to the generator vessel when and after the temperature of the absorber vessel has fallen to a substantial equality to that of the generator vessel.

18. In an absorption refrigerating system the combination of a plurality of vessels, half of them adapted to act as generators and half of them as absorbers alternately and simultaneously, condensers, evaporators and connecting pipe systems, and means for appropriately heating and cooling said vessels respectively, with means for delivering to either half of said vessels undergoing heating heat abstracted from the other half of said vessels undergoing cooling.

19. In an absorption refrigerating system, the combination of a condenser and a plurality of vessels adapted to act alternately and simultaneously, half of them as generators and half of them as absorbers, a condenser, an evaporator, a pipe system connecting the condenser to the generator absorbers and the evaporator, and means for applying the medium used to cool the condenser thereafter to the vessels only when acting as absorbers.

20. In an absorption refrigerating apparatus, the combination of two vessels adapted to act in cycles alternately and simultaneously as generator and as absorber, respectively, an evaporating system connected respectively at either end through independent condensers to the said two vessels, with means for limiting to a predetermined amount a flow of liquid from either condenser into said evaporating system, but permitting substantially unrestricted reverse return flow of liquid from said evaporating system to and through said condensers upon a reversal of cycle.

21. In an absorption refrigerating apparatus, the combination of two vessels adapted to act alternately and simultaneously as generator and as absorber, two condensers connected thereto, an evaporating system connected at either end respectively through said condensers to said two vessels with an enlarged section in said evaporating system divided by a septum into two communicating sections.

22. In an absorption refrigerating apparatus, the combination of two vessels adapted to act alternately and simultaneously as generator and as absorber, means for alternately applying heating and cooling media to said vessels, condensers connected to said vessels, an evaporator system connected at each end respectively to said condensers for cooling a predetermined space, with means responsive to the temperature of said predetermined space for controlling the said means for applying heating and cooling media.

23. In a refrigerating apparatus, the combination of two vessels adapted to act alternately and simultaneously as generator and as absorber, means for alternately applying heating and cooling media to said vessels, condensers connected to said vessels, a receptacle, and an evaporating system connected at each end respectively to said condensers.

24. In an absorption refrigerating apparatus the combination of two vessels adapted to act alternately and simultaneously as generator and as absorber, means for alternately and appropriately applying heating and cooling media to said vessels, condensers connected to said vessels, an evaporating system connected at each end respectively to said condensers adapted to cool a given receptacle, and means responsive to the temperature of said receptacle adapted to regulate the means for applying the heating and cooling media.

BENNET CARROLL SHIPMAN.